C. M. MANLY.
CONTROL MECHANISM FOR POWER DRIVEN DEVICES.
APPLICATION FILED OCT. 21, 1912.
1,203,223.  Patented Oct. 31, 1916.
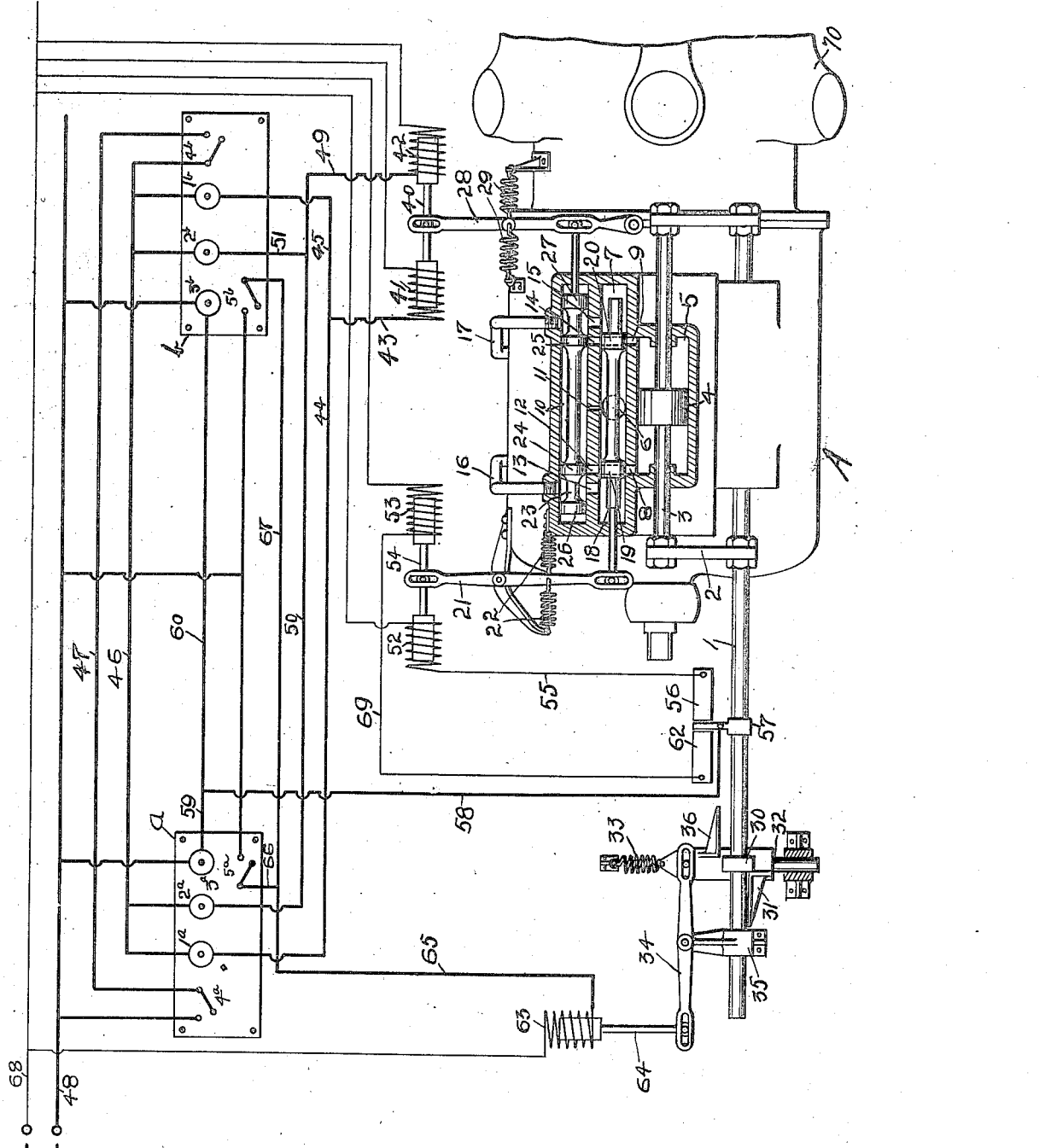
Attest:  Inventor:
Charles M. Manly
by W. B. Morton, his Atty.

UNITED STATES PATENT OFFICE.

CHARLES MATTHEWS MANLY, OF FREEPORT, NEW YORK.

CONTROL MECHANISM FOR POWER-DRIVEN DEVICES.

1,203,223. Specification of Letters Patent. Patented Oct. 31, 1916.

Application filed October 21, 1912. Serial No. 726,995.

*To all whom it may concern:*

Be it known that I, CHARLES M. MANLY, a citizen of the United States, residing at Freeport, Long Island, New York, have invented a new and useful Improvement in Control Mechanism for Power-Driven Devices, of which the following is a specification.

This invention relates to control mechanism for power operated driven devices for driving machinery and other loads, and particularly to mechanisms of the class described which are designed for controlling hydraulic variable speed gears of the general type covered by my prior Patent No. 801,097 of October 3, 1905, and of the specific character disclosed in my co-pending application No. 639,464, filed July 19, 1911.

The object of my invention is to produce a mechanism whereby the machine or part driven by the hydraulic variable speed gear may be started, stopped, reversed, and its speed varied from a point distant from the machine or from any of a number of points distantly located with regard to the machine controlled.

A further object of the invention is to provide a control mechanism of the character described by means of which the speed of the machine operated cannot be accelerated more rapidly than the construction of the machine or the nature of the material upon which it may be operated warrants.

A further object of the invention is to provide a control mechanism of the character described with safety devices whereby the operation of the speed-increasing control device may be nullified whenever desired to prevent further increases of speed.

A further object of the invention is to provide a control device having a supplementary mechanism whereby the driven machine may be rapidly stopped at any time, irrespective of the adjustment of the other parts of the control mechanism.

A further object of the invention is to provide a control mechanism having a plurality of controlling stations, and so arranged that the machine cannot be started without setting control devices at all the stations, but may be stopped from any of the stations irrespective of the adjustment of the control devices at the other stations.

Further objects of the invention will appear from the following description when read in connection with the accompanying drawing, in which I have disclosed a preferred embodiment of my improved control mechanism applied to a variable speed gear of the type described. It is to be understood, however, that my invention is not limited to the details of construction therein disclosed, but covers all modifications of the same as properly fall within the scope of the appended claims.

In the said drawing I have shown a plan view of a portion of the variable speed gear before referred to with the improved control mechanism applied thereto, portions of the latter being for convenience diagrammatically shown.

The hydraulic variable speed gear above referred to comprises essentially a variable stroke pump adapted to be operated by a suitable prime mover and connected by fluid transmitting passages with a hydraulic motor driving the part or machine to be operated. Means are provided for varying the stroke of the pump from a maximum to zero to give all capacities of fluid discharge in one direction of flow, and then from zero to maximum to give all variations in capacity in the opposite direction of flow, and as the motor is connected to the pump to form a closed fluid circuit, it is obvious that the motor will be driven at a speed and in a direction depending upon the capacity of the pump and the direction of flow of the fluid therefrom as determined by the adjustment of the stroke above described.

In the above mentioned prior application I have shown the adjustment of the pump stroke as effected by the movement of a single rod, and in the drawing of this application I have shown at A a portion of a transmission so constructed and constituting the power operated driving device to be controlled. The pump of said transmission is provided with a control rod 1 for effecting the various adjustments of the pump stroke.

In the drawing this rod is shown at its central neutral position, and it will be understood that movement of the rod in either direction from such position will give to the pump a stroke adjustment proportional to the extent of movement of the rod from the neutral position shown, and will cause the flow of fluid to be in a direction depending upon the direction of adjustment of the rod.

It will be understood that the mechanism so far described is disclosed in my prior application, and forms no part of the present invention, and that as described in the said application, the rod 160 of my prior application, and marked 1 in the drawing of my present application is intended to be adjusted by hand. By my present invention I provide a power adjustment for this rod and to that end I connect to it by arms 2 a parallel rod 3 on which is mounted a piston 4 working in a cylinder, 5, preferably formed integral with the pump casing 70. For operating the piston 5 I preferably employ fluid pressure taken from the hydraulic gear through a port 6 in the top of the casing 70. This port leads into a valve chamber 7 parallel with the cylinder 5 and connected with the cylinder at each end thereof by ports 8 and 9 respectively. Parallel with the valve chamber 7 and on the side remote from the cylinder 5 is a second valve chamber 10 connected to the valve chamber 7 at its middle portion by a small bore or bleed 11, and at each end by ports 12, 13 and 14, 15 respectively, whose purpose will be later described. Leading from the valve chamber 10 at points opposite the ports 13, 15 respectively are exhaust pipes 16 and 17 which connect with the bottom of the casing 70 to return the fluid used by the adjusting mechanism to the pump.

A piston valve 18 is mounted in the valve chamber 7 and is provided with two heads 19 and 20 which, when the valve is in its normal position, close the ports 8 and 9 from communication with the valve chamber 7, but permit fluid to reach the ports 8 and 9 from the valve chamber 10 through the ports 12 and 14 and transverse passages through the valve heads as indicated in dotted lines. Attached to the projecting stem of the valve 18 is a lever 21 fulcrumed on a bracket attached to the pump-casing and provided with springs 22 for holding it in its central neutral position in which the valve heads register with the ports of the valve chamber as described. Mounted in the valve chamber 10 is a piston valve 23 having heads 24 and 25 which, when the valve is in its normal position as shown in the drawing, close the ports 12 and 14 leading to the chamber 7 and thence to the cylinder 5 through the passages in the valve 18. The valve 23 is also provided with end heads 26 and 27 connected to the heads 24 and 25 by reduced necks of sufficient length to form continuously open passages from the ports 13 and 15 to the pipes 16 and 17 at all positions of adjustment of the valve 23. For actuating the valve 23 a lever 28 is provided, the said lever being pivoted on the casing and provided with springs 29 for maintaining it in its central neutral position.

Fast to the control rod 1 near its outer end is a lug or collar 30 which collar is adapted to engage a lug 31 on a bar 32 slidably mounted beneath the rod 1 in such a position that the collar engages the lug 31 when the rod is at its zero position to prevent the rod being adjusted to a reverse position without first shifting the slide 32 against the tension of its spring 33 which holds the lug 31 normally against the side of the rod. For actuating the slide 32 a lever 34 is provided, the said lever being mounted on a bracket 35 which supports the outer end of the rod 1. The slide 32 is also provided with a lug 36 to prevent movement in the opposite direction of the rod 1 through its zero position as will be later described.

Before describing the electrical devices for operating the controlling mechanism, I will describe the operation of the controlling mechanism as though it were to be governed by the direct manipulation of the several levers.

Let it be assumed that the parts are in the position shown in the drawing and that the port 6 is in communication with a constant source of fluid under pressure, thereby filling the chamber 7 between the heads 19 and 20 of the valve 18 with such fluid, and as the valve chamber 10 is in permanent connection with the valve chamber 7 through the bleed 11, this chamber will also be filled with fluid under pressure between the heads 24 and 25 of the valve 23. Now, if it be desired to start the hydraulic motor and consequently the machine operated, the lever 28 is adjusted to the left as shown in the drawing, so that the valve 23 uncovers the ports 12 and 14 connecting the port 12 with the bleed 11 and the port 14 with the exhaust pipe 17. The fluid under pressure in the valve chamber 10 will then flow through the port 12 and the passage in the valve head 19 into the cylinder 5 at the left of the piston 4, thereby shifting the piston to the right and with it the control rod 1 to give a stroke to the pump pistons proportional to the extent of the shifting movement, the direction of adjustment being such, it will be assumed, as to give the driven machine forward direction of rotation. The adjustment of the rod will obviously continue as long as the lever 28 is held out of its neutral position, and the movement of the piston will return the fluid in the right hand end of the cylinder through the ports and passages of the valve chambers to the pipe 17, and thence to the bottom of the casing.

When the machine operated reaches the desired speed, the lever 28 will be released and its springs 29 will return it to its central position, closing the ports 12 and 14, and preventing further adjustment of the rod. It will be understood that the rapidity of adjustment of the pump stroke is dependent upon the size of the bleed 11 relative to the diameter of the adjusting cylinder 5, provided, of course, the pressure of the actuating fluid and the resistance of the adjusting mechanism be constant. In heavy machines, such as printing presses, calendering machines, metal rolling machines, etc., which have considerable inertia, and very high starting friction, and which because of the material operated upon must be started absolutely smoothly, the bleed 11 is made small so that an appreciable time will be consumed in bringing the machine up to speed. The same mechanism may be used for stopping the machine by adjusting the lever 28 in the opposite direction to connect the port 14 with the source of fluid pressure through the bleed 11, and the port 12 with the exhaust pipe 16 thereby admitting fluid pressure to the cylinder 5 to the right of the piston 4 to shift it back to its central or zero position, illustrated in the drawing. It is to be understood, however, that when the machine is stopped in the manner described, it will take the same length of time to come to a stop that is required to bring it to a desired speed. When the machine is stopped for ordinary reasons, such as shutting down for the day, it is very well that it should be stopped slowly; but in case of an accident to the material operated upon, or the machinery, it might be necessary to stop the machine abruptly to avoid great damage. To effect such stopping, the lever 21 is provided, this lever being connected to the valve 18 in the chamber 7 adjacent the adjusting cylinder 5. Suppose the piston 4 to be to the right of its zero position, then to stop the machine abruptly the outer end of the lever 21 will be moved to the left to connect the port 9 directly with the source of fluid pressure 6, thereby cutting the bleed 11 out of the circuit so that the fluid under pressure can enter the cylinder rapidly and shift the piston back to its neutral position, moving the control rod 1 to the left until it is stopped by the engagement of the collar 30 with the arm 31. It would appear from the above that the machine could be started rapidly by means of the lever 21 as well as stopped abruptly, but the levers are not in practice to be actuated directly, and means are provided which I will later describe for preventing the operation of the lever 21 except in a direction to stop the machine when it has been put in motion by manipulation of the lever 28.

The purpose of the lever 34 and the mechanism controlled by it is to prevent reversal of the machine by the continued movement of the piston 4 and rod 1 in a direction to stop the machine. The operation of this mechanism is easily understood from the drawing. When the parts are free, the spring 33 holds the lug 31 against the rod 1 so that the collar 30 engages it when the rod is adjusted to zero position. The lug 36 is spaced from the lug 31 a distance equal exactly to the width of the collar 30 so that when the rod is at its zero position the lever 34 may be actuated to shift the slide 32 against the tension of the spring to bring the lug 36 into engagement with the collar 30 and rod 1, and move the lug 31 out of engagement with the collar 30 so that the rod 1 can be adjusted to the left to cause the pump stroke to be adjusted in a direction to reverse the direction of rotation of the hydraulic motor. Both the lugs 31 and 36 have extensions of such length that the slide 32 cannot be shifted in either direction when the rod 1 is out of its zero position.

For actuating the levers 21, 28 and 34 above described, electrical devices are provided which will now be described, it being understood that the circuits shown are merely typical in that the control-buttons and switches may be any distance from the machine controlled, and that any number of stations may be provided in addition to the two stations shown in the drawing.

In the drawing, $a$ represents one of the stations and $b$ the other. Each of the stations is provided with three control-buttons $1^a$, $2^a$, $3^a$, and $1^b$, $2^b$, $3^b$ respectively, and two switches $4^a$, $5^a$, and $4^b$, $5^b$ respectively. It will be understood that the buttons maintain their circuits open except when held depressed, but that the switches may be adjusted to either open or closed position. For actuating the lever 28 which controls the slow starting and stopping of the machine in either direction, there is attached to the outer end of the lever a cross-bar 40 to the opposite ends of which are attached the cores of solenoids 41 and 42, the solenoid 41 of which receives its current through a wire 43 having two branches 44, 45 which lead respectively to the push-buttons $1^a$ and $1^b$. Leading to these buttons are branches from a feed cable 46 which is connected through the switch $4^b$ with a cable 47 leading to the switch $4^a$, and thence to the main feed wire 48 of the source of electric current. The solenoid 42 is fed by wire 49 having two branches, 50 and 51 leading to the buttons $2^a$ and $2^b$ and thence to the feed cable 46.

The lever 21 which effects the quick stopping of the machine in either direction of rotation, is operated by two solenoids, 52, 53, whose cores are attached to a cross-bar 54 connected to the end of the lever. The solenoid 52 is connected by wire 55 to a contact plate 56 mounted adjacent and parallel to the control rod 1. Attached to the control rod 1 is a brush 57, which when the rod is in its zero position, lies immediately adjacent, but out of contact with the end of the plate 56, and when the rod is adjusted out of its zero position to any position to give the machine forward rotation, contacts with the plate 56, establishing electrical connection between the wire 55 and the feed wire 58 connected to the brush. The wire 58 has two branches, 59, 60, which lead to the buttons 3ᵃ and 3ᵇ and thence to the main feed cable 48. The solenoid 53 is connected by a wire 69 with a plate 62 similar to the plate 56 and adapted to be engaged by the brush 57 when the rod 1 is adjusted out of its zero position to any position which effects a reverse rotation of the machine.

For actuating the lever 34 a solenoid 63 is provided, its core being connected by a link 64 with the free end of the lever. A feed wire 65 leads to the solenoid and is provided with two branches 66 and 67 leading to the switches 5ᵃ and 5ᵇ respectively and thence to the main feed cable 48. All of the solenoids are provided with return wires connected in the customary manner to the return cable 68 of the system. In operation if it is desired to start the machine from the position of rest shown, the operator must first see that both switches 4ᵃ and 4ᵇ are closed so that the cable 46 is connected to the feed cable 48. Now, by pressing either of the buttons 1ᵃ or 1ᵇ, the solenoid 41 will be energized, drawing the cross-bar 40 to the left and with it the lever 28, thereby admitting fluid to the adjusting cylinder 5 and shifting the rod 1 in the manner described above to the right to an extent depending upon the length of time that the button is held pressed. After the machine reaches the desired speed the foreman of the shop, or the person in authority may open the switches 4ᵃ and 4ᵇ thereby cutting off the buttons 1ᵃ, 1ᵇ and 2ᵃ, 2ᵇ from the source of electric current so that the speed of the machine may be neither increased nor decreased without first going to both the stations *a* and *b*, or any more that there may be in any particular installation, and closing the switches 4ᵃ, 4ᵇ, etc. In an installation of this character, for instance in the press room of a newspaper, the various control stations *a*, *b*, will be distributed in various places about the room adjacent the different portions of the press, and one of the stations will be preferably located near the foreman's desk; hence, after he has started the machinery and brought it up to the proper speed, there can be no unwarranted adjustment of the mechanism without his knowledge, as all of the switches 4ᵃ, 4ᵇ, etc., have to be closed before either of the solenoids 41, 42 can be energized. As soon as the rod moves out of its zero position, the brush 57 contacts with the plate 56 connecting the solenoid 52 with the feed wire 58. If some accident should now occur, making it necessary to stop the machine quickly, either of the buttons 3ᵃ or 3ᵇ may be pressed, thereby closing the circuit through the solenoid 52 so that the lever 21 will be drawn to the left and fluid admitted to the cylinder 5 to the right of the piston 4 through the large port 9 to move the rod 1 quickly back to its neutral position in which the brush 57 is out of contact with the plate 56. After being once stopped in this manner, the machinery cannot be again started until the switches 4ᵃ, 4ᵇ, etc., are again closed.

If it be desired to reverse the machinery for the purpose for instance of cleaning the machine or releasing the material that may be left in it, the operator may do so by first closing one of the switches 5ᵃ or 5ᵇ when the control rod is at zero and then pressing either of the buttons 2ᵃ or 2ᵇ. Closing one of the switches 5ᵃ, 5ᵇ energizes the solenoid 63, thereby through the lever 34 shifting the slide 32 into position to remove the stop 31 from engagement with the collar 30 and the stop 36 into engagement with the rod 1, so that the rod is free to move to the left from its zero position. Pressing one of the buttons 2ᵃ, 2ᵇ causes the solenoid 42 to be energized, thereby drawing the lever 28 to the right uncovering the port 14 so that the fluid under pressure enters the cylinder 5 to the right of the piston 4 adjusting the rod 1 to the left. When so adjusted the brush 57 carried by the rod engages the contact plate 62 thereby conveying the current from the emergency stop buttons 3ᵃ, 3ᵇ to the solenoid 53 which when energized adjusts the valve 18 in a direction to cause the fluid under pressure to pass into the cylinder 5 through the large port 8 to quickly shift the piston 4 of the control rod 1 back to its zero position in which the collar 30 will engage the stop 36.

While I have described my improved control mechanism in connection with a hydraulic variable speed gear, it will of course be understood that other forms of power operating devices may be readily controlled thereby, the fluid pressure for operating the piston 4 being in such case supplied from a suitable source as a pump or pressure main.

Having thus described my invention, what I claim as new, and desire to secure by Letters Patent is—

1. The combination with a power-operated device for driving machinery or other loads of controlling mechanism therefor comprising mechanism for causing a slow starting and stopping of said device, and separate mechanism for effecting a quick stopping of said device.

2. The combination with a power-operated device for driving machinery or other loads of control mechanism therefor comprising means for effecting a slow starting of said device in either direction of rotation, and separate mechanism for effecting a quick stopping of said device when rotating in either direction.

3. The combination with a power-operated device for driving machinery or other loads of control mechanism therefor comprising means for effecting a slow starting and stopping of said device in either direction of rotation, and separate mechanism for effecting a quick stopping of said device when rotating in either direction.

4. The combination with a variable speed gear of a control mechanism therefor comprising means for effecting slow starting and gradual increases in speed of the driven part of said gear and separate mechanism for effecting a quick stopping and abrupt reduction in speed of said part.

5. The combination with a variable speed gear of a control mechanism therefor comprising means for effecting slow starting and gradual increases in speed, gradual decreases in speed and slow stopping of the driven part of said gear, and separate mechanism for effecting a quick stopping and abrupt reduction in speed of said part.

6. The combination with a variable speed gear of a control mechanism therefor for effecting the starting, stopping and variations in speed of said gear and means operatable at will for preventing further increases in speed without preventing the operation of said control mechanism to stop said gear.

7. The combination with a variable speed gear of means for controlling said gear embodying a device for gradually starting and increasing the speed of the driven part of said gear, means for quickly reducing the speed and stopping said part, and means operatable at will for disabling said starting and speed-increasing means without affecting the operation of said last named means.

8. The combination with a variable speed reverse gear of means for controlling said gear comprising a member operatable in opposite directions from a middle stop position to cause forward and reverse operation respectively of said gear, said controlling means comprising devices for shifting said member to its middle stop position to stop said gear, said devices being constructed to return said member to stop position irrespective of its position of adjustment, upon the same operation of said devices.

9. The combination with a variable speed gear of a plurality of devices located at different distant points for controlling said gear to start, stop and vary its speed and connections between certain of said devices whereby a device at each of two or more of said different distant points must be operated to start said gear.

10. The combination with a variable speed gear of a plurality of devices located at different distant points for controlling said gear to start, stop, reverse and vary its speed and connections between certain of said devices whereby a device at each of two or more of said different distant points must be operated to start said gear.

11. The combination with a power-operated driving mechanism of a control mechanism therefor comprising a plurality of devices located at separate distant points, and connections between said mechanism and said devices whereby the devices at all said points must be operated to start said mechanism and the operation of a device at any one of said points to stop said mechanism.

12. The combination with a hydraulic variable speed gear of controlling means therefor, means operated by fluid pressure for operating said control mechanism to start, stop and vary the speed of said gear, and means for controlling said fluid pressure operated mechanism to slowly start and gradually increase the speed of said gear, and a separate control mechanism for causing said fluid pressure operated means to quickly stop said gear.

13. The combination with a hydraulic variable speed gear of a control member therefor adapted when shifted from one extreme position to its other extreme position to vary the speed of the driven part of said gear from a maximum in one direction through zero to a maximum in the opposite direction, a mechanism for operating said control member, and a separate mechanism for preventing the operation of said member from one side to the other of its zero position in either direction of operation.

14. The combination with a hydraulic variable speed gear of a control member therefor adapted when shifted from one extreme position to its other extreme position to vary the speed of the driven part of said gear from a maximum in one direction through zero to a maximum in the opposite direction, a mechanism for operating said control member, and a separate mechanism for preventing the operation of said member from one side to the other of its zero position in either direction of operation, said last mentioned means being operatable only when said control member is at its zero position to permit continued adjustment of said member to effect the reversal of the driven member of said gear.

15. The combination of a variable speed gear, a driving member and a driven member, and means for altering the speed ratio of said members, said means being constructed to prevent a rapid increase in the speed of said driven member and permit a rapid decrease in speed.

16. The combination of a hydraulic variable speed gear comprising a variable capacity pump, and means for varying the capacity of said pump, said means being organized so that the capacity of the pump cannot be increased as rapidly as it can be decreased.

In testimony whereof, I, said CHARLES M. MANLY, have signed my name to this specification in the presence of two subscribing witnesses, this 19th day of October, 1912.

CHARLES MATTHEWS MANLY.

Witnesses:
  A. I. MILLER,
  W. B. MORTON.